United States Patent
Schäfer et al.

(10) Patent No.: US 7,026,424 B2
(45) Date of Patent: Apr. 11, 2006

(54) ORGANOPOLYSILOXANE/POLYUREA/ POLYURETHANE BLOCK COPOLYMERS

(75) Inventors: Oliver Schäfer, München (DE); Sabine Delica, München (DE); Wolfram Schindler, Tüssling (DE); Bernd Pachaly, Mehring-Öd (DE)

(73) Assignee: Consortium fur Elektrochemische Industrie GmbH, Munich (DE)

( * ) Notice: Subject to any disclaimer, the term of this patent is extended or adjusted under 35 U.S.C. 154(b) by 46 days.

(21) Appl. No.: 10/485,174

(22) PCT Filed: Apr. 25, 2002

(86) PCT No.: PCT/EP02/04601

§ 371 (c)(1),
(2), (4) Date: Jan. 29, 2004

(87) PCT Pub. No.: WO03/014194

PCT Pub. Date: Feb. 20, 2003

(65) Prior Publication Data

US 2004/0210024 A1  Oct. 21, 2004

(30) Foreign Application Priority Data

Aug. 2, 2001 (DE) ............................... 101 37 855

(51) Int. Cl.
*C08G 77/458* (2006.01)
(52) U.S. Cl. ........................ 528/38; 528/28; 528/29; 528/44; 528/85

(58) Field of Classification Search ............... 528/37, 528/38, 44
See application file for complete search history.

(56) References Cited

U.S. PATENT DOCUMENTS

| 5,214,119 | A | * | 5/1993 | Leir et al. | 528/28 |
|---|---|---|---|---|---|
| 5,221,724 | A | * | 6/1993 | Li et al. | 528/28 |
| 6,355,759 | B1 | * | 3/2002 | Sherman et al. | 528/28 |
| 6,534,615 | B1 | * | 3/2003 | Schafer et al. | 528/38 |
| 6,664,359 | B1 | * | 12/2003 | Kangas et al. | 528/38 |

FOREIGN PATENT DOCUMENTS

EP  250 248  12/1987

OTHER PUBLICATIONS

I. Yilgör, Polymer, 1984 (25), 1800.

* cited by examiner

*Primary Examiner*—Marc S. Zimmer
(74) *Attorney, Agent, or Firm*—Brooks Kushman P.C.

(57) ABSTRACT

Organopolysiloxane/polyurea/polyurethane block copolymer elastomers exhibiting improved physical properties are prepared by reacting diisocyanates with aminoalkyl-functional organopolysiloxanes containing substantially no cyclic siloxanes, prepared by reacting a cyclic silazane with a bis(hydroxy)-organopolysiloxane. Traditional hydroxyl and amino-functional chain extenders may be reacted as well, to produce a wide range of block copolymer elastomers.

20 Claims, No Drawings

ORGANOPOLYSILOXANE/POLYUREA/POLYURETHANE BLOCK COPOLYMERS

CROSS-REFERENCE TO RELATED APPLICATION

This application claims priority to PCT. Appln. No. PCT/US02/04601 filed Apr. 25, 2002, and to German application 101 37 855.6 filed Aug. 2, 2001.

BACKGROUND OF THE INVENTION

1. Field of the Invention

The invention relates to organopolysiloxane/polyurea/polyurethane block copolymers.

2. Description of the Related Art

The properties of polyurethanes and silicone elastomers are complementary in many areas. Polyurethanes are notable for their outstanding mechanical strength, elasticity, and very good adhesion, abrasion resistance, and ease of processing by extrusion from the melt. Silicone elastomers, on the other hand, possess an excellent temperature, UV stability, and weathering stability. They retain their elastic properties at relatively low temperatures and consequently do not tend toward embrittlement either. In addition they possess special water repellency and antistick surface properties.

Conventional polysiloxanes are employed for elastomers, seals, adhesives, and sealants or antistick coatings in the form of thixotropic pastes. In order to achieve the desired ultimate strengths different ways of curing the compositions have been developed, with the objective of fixing the desired structures and setting the mechanical properties. In the majority of cases, however, the polymers must be blended, by the addition of reinforcing additives, such as pyrogenic silicas, for example, in order to attain adequate mechanical properties. In the curing systems a distinction is made essentially between high temperature vulcanizing (HTV) systems and room temperature vulcanizing (RTV) systems. In the case of the RTV compositions there are both one-component (1K) and two-component (2K) systems. In the 2K systems, the two components are mixed and hence catalytically activated and cured. The curing mechanism and the catalyst required can in this case be different. Curing is normally accomplished by peroxidic crosslinking, by hydrosilylation by means of platinum catalysis or, for example, by condensation reactions. Although such 2K systems possess very long pot lives, the attainment of optimum properties requires very precise compliance with the mixing proportions of the two components, leading to increased complexity of apparatus in processing. 1K systems likewise cure by peroxidic crosslinking, by hydrosilylation by means of platinum catalysis or, for example, by condensation reactions. In this case, however, either an additional processing step for compounding in the crosslinking catalyst is necessary or the compositions have only a limited pot life. A feature common to all these systems, however, is that the products are insoluble after processing and also, for example, can no longer be recycled.

Consequently the combination of urethane polymers and silicone polymers ought to provide access to materials having good mechanical properties, which at the same time feature processing possibilities which are greatly simplified as compared with the silicones, while continuing to possess the positive properties of the silicones. The combination of the advantages of both systems can therefore lead to compounds having low glass transition temperatures, low surface energies, improved thermal and photochemical stabilities, low water absorption, and physiologically inert materials.

SUMMARY OF THE INVENTION

The disadvantages of prior art products have been improved upon through the use of specific organopolysiloxane/polyurea/polyurethane block copolymers prepared by reacting an organosilicon compound bearing silanol hydroxyl groups with a cyclic silazane, followed by reaction with a diisocyanate.

DETAILED DESCRIPTION OF THE INVENTION

Investigations have been carried out in order to overcome the poor phase compatibilities of the two systems. Adequate compatibilities were achievable in only a few special cases through the production of polymer blends. Not until the preparation of polydiorganosiloxane-urea block copolymers, described in I. Yilgor, Polymer, 1984 (25), 1800 and in EP-A-250248, was it possible to achieve this objective. The reaction of the polymer building blocks takes place ultimately by a comparatively simple polyaddition, as is employed for the preparation of polyurethanes. As starting materials, aminoalkyl-terminated polysiloxanes are used as siloxane building blocks for the siloxane-urea copolymers. They form the soft segments in the copolymers, analogous to the polyethers in pure polyurethane systems. As hard segments use is made of customary diisocyanates, which can also be modified by adding diamines, such as 1,6-diaminohexane, or dihydroxy compounds, such as butanediol, for example, in order to achieve higher strengths. The reaction of the amino compounds with isocyanates is spontaneous and generally requires no catalyst.

The silicone building blocks and isocyanate building blocks of the polymer are readily miscible within a wide range. The mechanical properties are determined by the ratio of the different polymer blocks—soft silicone segments and hard urea segments—and, critically, by the diisocyanate used. As a result of the strong interactions of the hydrogen bonds between the urea units these compounds possess a defined softening point, and thermoplastic materials are obtained. These thermoplastic materials can be conceived for use in numerous applications: in sealants, adhesives, as material for fibers, as plastics additives, e.g., as impact modifiers or flame retardants, as material for defoamer formulations, as a high-performance polymer (thermoplastic, thermoplastic elastomer, elastomer), as packaging material for electronic components, in insulating materials or shielding materials, in cable sheathing, in antifouling materials, as an additive for scouring, cleaning or polishing products, as an additive for bodycare compositions, as a coating material for wood, paper, and board, as a mold release agent, as a biocompatible material in medical applications such as contact lenses, as a coating material for textile fibers or textile fabric, as a coating material for natural substances such as leather and furs, for example, as a material for membranes and as a material for photoactive systems, for example, for lithographic techniques, optical data securement or optical data transmission.

Accordingly there is a demand for siloxane-urea copolymers which have high molecular weights and, as a result, favorable mechanical properties such as, for example, high tensile strengths and elongations at break and at the same time exhibit good processing properties, such as low viscosity and absence of solvent. A further curing step for crosslinking these materials is unnecessary, since as a result of meltable constituents they have physical crosslinking sites which by raising the temperature can be destroyed again and reoriented. It ought also to be ensured that these materials can be prepared from inexpensive and readily available starting materials, in order to be able to compete economically as well with existing systems. Both in Yilgör et al. and in EP-A-250 248 the aminoalkyl functional siloxanes used as starting material are prepared by way of equilibration reactions. EP-A-250 248 describes how, exclusively by way of an equilibration reaction carried out particularly carefully with specific equilibration catalysts, aminoalkyl-terminated PDMS chains are obtained which even in relatively high molecular weight regions possess sufficient purity to ensure, in the reaction with diisocyanates, the high molecular weights that are required for good mechanical properties in the end polymers.

Difunctional silicone oils prepared by way of equilibration reactions, however, have a number of disadvantages:

The equilibration reaction described in EP-A-250 248 is a very protracted reaction in which, moreover, it is necessary to use a very expensive starting material such as bisaminopropyltetramethyldisiloxane and specific catalyts, which must be synthesized as an extra. This is unfavorable from an economic standpoint. Furthermore, at the end of the equilibration reaction, the catalyst must either be thermally deactivated or be neutralized, leading to catalyst residues and hence impurities in the end product, with consequences for the thermal stability of the materials thus produced. These impurities are likewise responsible for a strong intrinsic odor in the materials synthesized from them. It is also necessary to remove about 15% of siloxane rings; from a technical standpoint, however, it is generally not possible to achieve this completely, and so siloxane rings of this kind remain in the product and are exuded from downstream products. In the course of thermal treatment the silicone oils prepared in this way show a tendency to take on a clearly visible yellow tinge.

The invention provides
an organopolysiloxane/polyurea/polyurethane block copolymer (A) of the general formula (1)

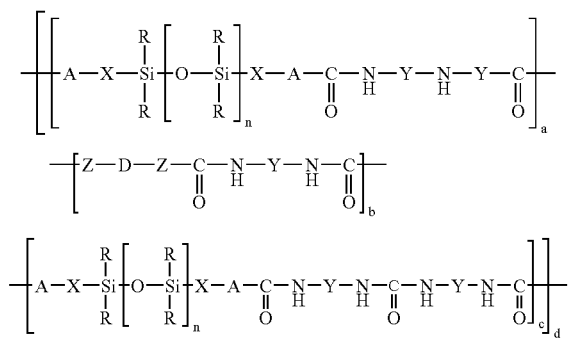

which is obtainable by a process which comprises two steps, where
in the first step a cyclic silazane of the general formula (2)

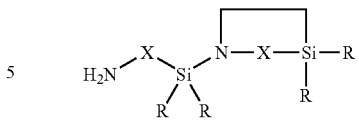

is reacted with organosilicon compound of the general formula (3)

to give aminoalkylpolydiorganosiloxane of the general formula (4)

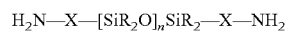

and
in the second step the aminoalkylpolydiorganosiloxane of the general formula (4) is polymerized with diisocyanate of the general formula (5)

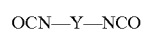

where
R is a monovalent hydrocarbon radical optionally substituted by fluorine or chlorine and having 1 to 20 carbon atoms, X is an alkylene radical having 1 to 20 carbon atoms, in which nonadjacent methylene units may have been replaced by —O— groups, A is an oxygen atom or an amino group —NR'—, Z is an oxygen atom or an amino group —NR'—, R' is hydrogen or an alkyl radical having 1 to 10 carbon atoms, Y is a divalent hydrocarbon radical optionally substituted by fluorine or chlorine and having 1 to 20 carbon atoms, D is an alkylene radical optionally substituted by fluorine, chlorine, $C_1$–$C_6$-alkyl or $C_1$–$C_6$-alkyl ester and having 1 to 700 carbon atoms, in which nonadjacent methylene units may have been replaced by —O—, —COO—, —OCO—, or —OCOO— groups, n is a number from 1 to 4000, a is a number which is at least 1, b is a number from 0 to 40, c is a number from 0 to 30, and d is a number greater than 0.

The preparation of the aminoalkylpolydiorganosiloxane of the general formula (4) is inexpensive, takes place under very gentle conditions, and leads to products which are odorless and colorless. Aminoalkylpolydiorganosiloxane of the general formula (4) contains neither cyclic silicone compounds, since these were removed at the stage of the silanol-terminated starting materials of the general formula (3), nor equilibration catalysts or residues thereof, since the reaction of silanol groups with the heterocycle of the general formula (2) takes place uncatalyzed in a very short time. Consequently these functionalized silicone oils and their derivatives are odorless and colorless.

Ideally in the first step the heterocycles of the general formula (2) and the starting materials containing silanol groups are used in equimolar proportions, since in this way there is no need to remove excess heterocycle. For this purpose the amount of active H in the silanol-terminated starting material is preferably determined, for example, by titration, so as to be able to add an at least equimolar amount of heterocycles. This gives bisaminoalkyl-terminated siloxanes of the general formula (4) in high purity, which are likewise suitable for the preparation of high molecular mass siloxane-urea block copolymers.

In order to achieve relatively short reaction times in the preparation of high-purity bisaminoalkyl-terminated silicones of the general formula (4) it is preferable to use a small excess of the heterocyclic compound of the general formula (2), which can be removed subsequently in a simple additional process step such as, for example, the addition of small amounts of water.

Preferably R is a monovalent hydrocarbon radical which has 1 to 6 carbon atoms and is in particular unsubstituted. Particularly preferred radicals R are methyl, ethyl, vinyl, and phenyl.

X is preferably an alkylene radical having 2 to 10 carbon atoms. The alkylene radical X is preferably not interrupted.

A is preferably an NH group.

Z is preferably an oxygen atom or an NH group.

Y is preferably a hydrocarbon radical having 3 to 13 carbon atoms which is preferably unsubstituted. Y is preferably an aralkylene radical or linear or cyclic alkylene radical.

D is preferably an alkylene radical having at least 2, in particular at least 4, carbon atoms and not more than 12 carbon atoms.

D is likewise preferably a polyoxyalkylene radical, especially polyoxyethylene radical or polyoxypropylene radical, having at least 20, in particular at least 100, carbon atoms and not more than 800, in particular not more than 200, carbon atoms.

The radical D is preferably unsubstituted.

n is preferably a number which is at least 3, in particular at least 25, and preferably not more than 800, in particular not more than 400, with particular preference not more than 250.

a is preferably a number which is not more than 50.

If b is other than 0, b is preferably a number which is not more than 50, in particular not more than 25.

c is preferably a number which is not more than 10, in particular not more than 5.

The polydiorganosiloxane-urea copolymer of the general formula (1) exhibits high molecular weights and good mechanical properties in combination with good processing properties.

Primarily through the use of chain extenders such as dihydroxy compounds or water in addition to the urea groups it is possible to achieve a distinct improvement in mechanical properties. In this way it is possible to obtain materials which in terms of their mechanical properties are entirely comparable with conventional silicone rubbers but have an increased transparency and do not require the incorporation of any additional active filler.

If b is at least 1 it is possible in the second step to use up to 95 percent by weight, based on all of the components employed, of chain extenders, which are selected from diamines, isocyanate-blocked hydroxy compounds, dihydroxy compounds or mixtures thereof.

The chain extenders preferably have the general formula (6)

HZ-D-ZH where D and Z have the above definitions. If Z has the definition O, the chain extender of the general formula (6) can also be reacted with diisocyanate of the general formula (5) prior to the reaction in the second step. If desired it is also possible to use water as chain extender.

The copolymer of the general formula (1) preferably contains, based on the sum of the urethane groups and urea groups, at least 50 mol %, in particular at least 75 mol %, of urea groups.

Examples of the diisocyanates of the general formula (5) that are to be used are aliphatic compounds such as isophorone diisocyanate, hexamethylene 1,6-diisocyanate, tetramethylene 1,4-diisocyanate, and methylenedicyclohexyl 4,4'-diisocyanate or aromatic compounds such as methylenediphenyl 4,4'-diisocyanate, 2,4-toluene diisocyanate, 2,5-toluene diisocyanate, 2,6-toluene diisocyanate, m-phenylene diisocyanate, p-phenylene diisocyanate, m-xylene diisocyanate, tetramethyl m-xylene diisocyanate or mixtures of these isocyanates. An example of commercially available compounds are the diisocyanates of the DESMODUR® series (H, I, M, T, W) from Bayer AG, Germany. Preference is given to aliphatic diisocyanates in which Y is an alkylene radical, since these materials lead, which show improved UV stabilities, which is an advantage in the case of exterior application of the polymers.

The α,ω-OH-terminated alkylenes of the general formula (6) are preferably polyalkylenes or polyoxyalkylenes. They are preferably substantially free from contaminations originating from polyoxyalkylenes with a functionality of one, three or more. In this context it is possible to use polyetherpolyols, polytetramethylenediols, polyesterpolyols, polycaprolactonediols, but also α,ω-OH-terminated polyalkylenes based on polyvinyl acetate, polyvinyl acetate-ethylene copolymers, polyvinyl chloride copolymer, polyisobutyldiols. Preference is given here to using polyoxyalkyls, with particular preference polypropylene glycols. Compounds of this kind are available commercially, as base materials, inter alia, for flexible polyurethane foams and for coating applications, with molecular masses Mn of up to more than 10 000. Examples thereof are the BAYCOLL® polyetherpolyols and polyesterpolyols from Bayer AG, Germany or the Acclaim® polyetherpolyols from Lyondell Inc., USA. It is also possible to use monomeric α,ω-alkylenediols, such as ethylene glycol or propanediol, butanediol or hexanediol. As dihydroxy compounds for the purposes of the invention it is additionally possible, likewise, to consider bishydroxyalkyl silicones, as sold, for example, by Goldschmidt under the name Tegomer H-Si 2111, 2311, and 2711.

The above-described copolymers of the general formula (1) can be prepared either in solution or without solvent, continuously or batchwise. What is essential is that for the chosen polymer mixture under the reaction conditions the commixing of the constituents is optimum and homogeneous and any incompatibility between the phases is prevented by means of solubilizers. The preparation depends on the solvent used. Where the fraction of the hard segments such as urethane units or urea units is large, it may be necessary to choose a solvent having a high solubility parameter such as dimethylacetamide, for example. For the majority of syntheses THF has proven sufficiently suitable. Preferably all of the constituents are dissolved in an inert solvent. Particular preference is given to a synthesis without solvent.

For the reaction without solvent the homogenization of the mixture is of critical importance for the reaction. Additionally the polymerization may also be controlled through the choice of reaction sequence in a staged synthesis.

For better reproducibility the preparation ought generally to take place in the absence of moisture and under an inert gas, usually nitrogen or argon.

As is normally the case with the preparation of polyurethanes the reaction takes place preferably by addition of a catalyst. Suitable catalysts for the preparation are dialkyltin compounds, such as dibutyltin dilaurate or dibutyltin diacetate, for example, or tertiary amines such as N,N-dimethylcyclohexanamine, 2-dimethylaminoethanol or 4-dimethylaminopyridine, for example.

Preferred applications of the polydiorganosiloxane-urea copolymers of the general formula (1) are their uses as a constituent in adhesives and sealants, as a base material for thermoplastic elastomers such as cable sheathing, hoses, seals, keyboard mats, for example, for membranes, such as selectively gas-permeable membranes, as additives in polymer blends, or for coating applications, e.g., in antistick coatings, tissue-compatible coatings, flame-retardant coatings, and as biocompatible materials.

All of the above symbols of the above formulae have their definitions in each case independently of one another.

In the examples below, unless indicated otherwise in each case, all amounts and percentages are given by weight and all pressures are 0.10 MPa (abs.). All viscosities were determined at 20° C. The molecular masses were determined by means of GPC in toluene (0.5 ml/min) at 23° C. (column: PLgel Mixed C+PLgel 100 A, detector: RI ERC7515).

COMPARATIVE EXAMPLE 1

A 2000 ml flask was charged with 1550 g of octamethylcyclotetrasiloxane (D4) and 124 g of bisaminopropyltetramethyldisiloxane (M=248 g/mol). Subsequently 1500 ppm of tetramethylammonium hydroxide were added and the mixture was equilibrated at 100° C. for 12 hours. It was then heated at 150° C. for 2 hours, after which 160 g of D4 cycle were distilled off. This gave a bisaminopropyl-terminated polydimethylsiloxane having a molecular weight of 3000 g/mol, a slight yellowish coloration, and a distinctly perceptible amine odor.

COMPARATIVE EXAMPLE 2

Using the amine oil prepared in comparative example 1 a block copolymer was prepared by reaction with diisocyanate in a 250 ml flask with dropping funnel and reflux condenser. 40 g of bisaminopropyl-PDMS (molar weight 3000) were introduced as an initial charge in a solvent mixture made up of 80 ml of dry THF and 20 ml of dimethylacetamide. Then at room temperature a solution of 2.33 g of methylenedi-p-phenyl diisocyanate in 20 ml of dry THF was added dropwise and the mixture was subsequently boiled under reflux for 1 hour. After the solution had cooled the polymer was precipitated by dropwise introduction into hexane. This gave a copolymer having a molecular weight of Mw 161,000 g/mol which showed a softening range at 154° C. in TMA. The block copolymer showed the same yellow coloration as the amine oil used as starting material, and it was also not possible to remove this coloration even by multiple reprecipitation from hexane. The amine odor was likewise still distinctly perceptible in the polymer.

EXAMPLE 1

A 2000 ml flask with dropping funnel and reflux condenser was charged with 1500 g of bishydroxy-terminated polydimethylsiloxane (molar weight 3000 g/mol). Subsequently at room temperature 116 g of 1-(3-aminopropyl-1,1-dimethylsilyl)-2,2-dimethyl-1-aza-2-silacyclopentane were added dropwise and the mixture was then left to stand for 1 hour. This gave a glass-clear bisaminopropyl-terminated polydimethylsiloxane having a molecular weight of 3200 g/mol which according to 29Si—NMR was free of Si—OH groups and had no inherent odor at all.

EXAMPLE 2

A 2000 ml flask with dropping funnel and reflux condenser was charged with 1080 g of bishydroxy-terminated polydimethylsiloxane (molar weight 10 800 g/mol). Subsequently at a temperature of 60° C. 23.2 g of 1-(3-aminopropyl-1,1-dimethylsilyl)-2,2-dimethyl-1-aza-2-silacyclopentane were added dropwise and the mixture was then stirred at 60° C. for 5 hours. Cooling gave a glass-clear bisaminopropyl-terminated polydimethylsiloxane having a molecular weight of 11,000 g/mol which according to 29Si—NMR was free of Si—OH groups and had no inherent odor at all.

EXAMPLE 3

A 250 ml flask with dropping funnel and reflux condenser was charged with 40 g of bisaminopropyl-PDMS (molar weight 3200) in a solvent mixture made up of 80 ml of dry THF and 20 ml of dimethylacetamide. Subsequently at room temperature a solution of 2.33 g of methylenedi-p-phenyl diisocyanate in 20 ml of dry THF was added dropwise and the mixture was then boiled under reflux for 1 hour. After the solution had been cooled the polymer was precipitated by dropwise introduction into hexane. This gave a clear copolymer having a molecular weight of Mw 161,000 g/mol, which showed a softening range at 154° C. in TMA and had no inherent odor.

EXAMPLES 4–9

In analogy to Example 3 a bisaminopropyl-PDMS having a molecular weight of 3200 g/mol or 11,000 g/mol was reacted with other diisocyanates.

| Example | Amine oil | Diisocyanate | Yield | Molecular weight (Mw) [g/mol] | Softening |
|---|---|---|---|---|---|
| 4 | 3200 g/mol | IPDI | 95% | 88,000 | 65° C. |
| 5 | 3200 g/mol | HMDI | 92% | 95,000 | 63° C. |
| 6 | 3200 g/mol | TDI | 88% | 114,000 | 131° C. |
| 7 | 3200 g/mol | TMXDI | 96% | 110,000 | 171° C. |
| 8 | 3200 g/mol | H12MDI | 94% | 97,000 | 126° C. |
| 9 | 11,000 g/mol | MDI | 89% | 154,000 | not determined |
| 10 | 11,000 g/mol | IPDI | 87% | 167,000 | not determined |
| 11 | 11,000 g/mol | TDI | 93% | 198,000 | not determined |
| 12 | 11,000 g/mol | H12MDI | 91% | 212,000 | not determined |

EXAMPLE 13

In a twin-screw extruder from Collin, Ebersberg with 4 heating zones, under a nitrogen atmosphere, the diisocyanate was metered in the first heating zone and the aminopropyl-terminated silicone oil was metered in the second heating zone. The temperature profile of the heating zones was programmed as follows: zone 1 30° C., zone 2 100° C., zone 3 150° C., zone 4 140° C. The rotational speed was 50 rpm. The diisocyanate (methylenebis(4-isocyanatocyclohexane))

was metered in zone 1 at 304 mg/min and the amine oil (3200 g/mol) was metered in zone 2 at 3.5 g/min. The material taken off at the die of the extruder was a clear polydimethylsiloxane-polyurea block copolymer having a molecular weight of 110,000 g/mol and a softening temperature of 126° C., and no inherent odor.

EXAMPLE 14

In analogy to Example 13 in a twin-screw extruder from Collin, Ebersberg (Teach-Line) with 4 heating zones, under a nitrogen atmosphere and with the following temperature profile (zone 1 30° C., zone 2 90° C., zone 3 120° C., zone 4 130° C., rotational speed=50 rpm), the diisocyanate (isophorone diisocyanate) was metered in zone 1 at 179 mg/min and the amine oil (3200 g/mol) in zone 2 at 3.5 g/min. The material taken off at the die of the extruder was a clear, odorless polydimethylsiloxane-polyurea block copolymer having a softening temperature of 58° C. It had a molecular weight of 52,000 g/mol.

EXAMPLE 15

In analogy to Example 13 in a twin-screw extruder from Collin, Ebersberg (Teach-Line) with 4 heating zones, under a nitrogen atmosphere and with the following temperature profile (zone 1 30° C., zone 2 100° C., zone 3 170° C., zone 4 180° C., rotational speed=50 rpm), the diisocyanate (toluene 2,4-diisocyanate) was metered in zone 1 at 111 mg/min and the amine oil (11,000 g/mol) in zone 2 at 5.2 g/min. The material taken off at the die of the extruder was a polydimethylsiloxane-polyurea block copolymer having a softening temperature of 87° C. It had a molecular weight of 195,000 g/mol.

EXAMPLE 16

A 250 ml flask with dropping funnel and reflux condenser was charged with 32 g of bisaminopropyl-PDMS (molar weight 3200) and 5 g of bishydroxypropyl-PDMS (Tegomer 2711, Th. Goldschmidt AG, molar weight 5200) in a solvent mixture made up of 80 ml of dry THF and 20 ml of dimethylacetamide. Following the addition of 3 drops of dibutyltin dilaurate, at room temperature a solution of 2.5 g of isophorone diisocyanate in 20 ml of dry THF was added dropwise and the mixture was then boiled under reflux for 2 hours. After the solution had been cooled the polymer was precipitated by dropwise introduction into hexane. This gave a copolymer having a molecular weight of Mw 78,000 g/mol, which showed a softening point at 42° C.

EXAMPLE 17

A 250 ml flask with dropping funnel and reflux condenser was charged with 32 g of bisaminopropyl-PDMS (molar weight 3200) and 0.9 g of butanediol in a solvent mixture made up of 80 ml of dry THF and 20 ml of dimethylacetamide. Following the addition of 3 drops of dibutyltin dilaurate, at room temperature a solution of 4.5 g of isophorone diisocyanate in 20 ml of dry THF was added dropwise and the mixture was then boiled under reflux for 2 hours. After the solution had been cooled the polymer was precipitated by dropwise introduction into hexane. This gave a copolymer having a molecular weight of Mw 63,000 g/mol.

EXAMPLE 18

A 250 ml flask with dropping funnel and reflux condenser was charged with 32 g of bisaminopropyl-PDMS (molar weight 3200) and 1.2 g of hexamethylenediamine in a solvent mixture made up of 80 ml of dry THF and 20 ml of dimethylacetamide. Following the addition of a solution of 4.5 g of isophorone diisocyanate in 20 ml of dry THF the mixture was boiled under reflux for 2 hours. After the solution had been cooled the polymer was precipitated by dropwise introduction into hexane. This gave a copolymer having a molecular weight of Mw 73,000 g/mol.

The foregoing examples show that high molecular mass siloxane-urea block copolymers can also be prepared using aminosilicones which are not prepared by particular equilibration reactions. These materials not only exhibit a better pattern of properties than the materials known to date (odorless, absolutely colorless), but are also substantially quicker to prepare.

The invention claimed is:
1. A colorless organopolysiloxane/polyurea/polyurethane block copolymer (A) of the formula

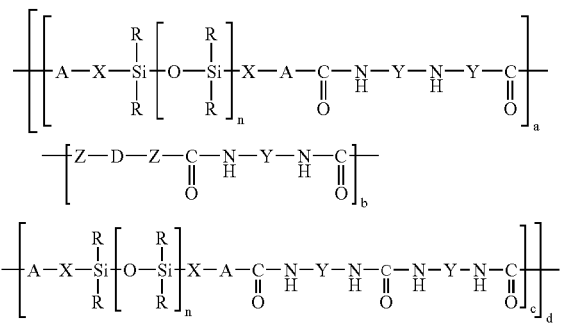

which is prepared by a process comprising
in a first step, reacting a cyclic silazane of the formula

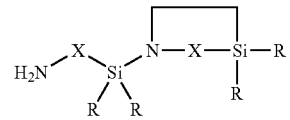

with at least one organosilicon compound of the formula

to give aminoalkylpolydiorganosiloxane(s) of the formula

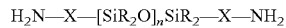

and
in the second step, polymerizing the aminoalkylpolydiorganosiloxane(s) of the formula (4) with at least one diisocyanate of the formula

optionally with one or more diamine chain extenders; and with at least one of isocyanate blocked dihydroxy chain extenders, dihydroxy chain extenders, bis(hydroxyalkyl)organopolysiloxanes, or water, where
R is a monovalent hydrocarbon radical optionally substituted by fluorine or chlorine and having 1 to 20 carbon atoms,
X is an alkylene radical having 1 to 20 carbon atoms, in which nonadjacent methylene units are optionally replaced by —O— groups,
A is an oxygen atom or an amino group —NR'—,
Z is an oxygen atom or an amino group —NR'—,
R' is hydrogen or an alkyl radical having 1 to 10 carbon atoms,
Y is a divalent hydrocarbon radical optionally substituted by fluorine or chlorine and having 1 to 20 carbon atoms,
D is an alkylene radical optionally substituted by fluorine, chlorine, $C_1$–$C_6$-alkyl or $C_1$–$C_6$-alkyl ester and having 1 to 700 carbon atoms, in which nonadjacent methylene units are optionally replaced by —O—, —COO—, —OCO—, or —OCOO— groups,
n is from 1 to 4000,
a is is at least 1,
b is from 0 to 40,
c is from 0 to 30, and
d is greater than 0.

2. The copolymer of claim 1, wherein n is an integer from 25 to 250.

3. The copolymer of claim 1, wherein R is methyl.

4. The copolymer of claim 1, wherein X is propylene.

5. The copolymer of claim 1, wherein Z is an amino group.

6. The copolymer of claim 1, wherein Z is an oxygen atom.

7. The copolymer of claim 1, wherein Y is an aralkylene radical.

8. The copolymer of claim 1, wherein Y is a linear or cyclic alkylene radical.

9. The block copolymer of claim 1, comprising reacting an aminoalkyl-functional organopolysiloxane free of cyclic siloxanes and prepared by the process of
reacting a cyclic silazane of the formula

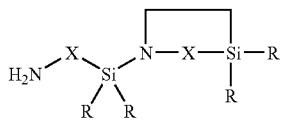

with at least one organosilicon compound of the formula (HO)($R_2$SiO)$_{n-1}$[H]

to give aminoalkylpolydiorganosiloxane(s) of the formula $H_2N$—X—[$SiR_2O$]$_n$$SiR_2$—X—$NH_2$ and
and polymerizing said aminoalkyl-functional organopolysiloxane with an isocyanate component comprising a diisocyanate of the formula

OCN—Y—NCO wherein said step of polymerizing further includes adding and reacting at least one chain extending agent reactive with isocyanates and selected from the group consisting of HZ-D-ZH where D is $C_{2-12}$ alkylene, polyetherpolyols, polytetramethylenediols, polyesterpolyols, polycaprolactonediols, α,ω,-OH-terminated polyalkylenes based on polyvinyl acetate, polyvinyl acetate-ethylene copolymers, polyvinyl chloride copolymer, polyisobutylenediols and bishydroxyalkyl silicones.

10. The process of claim 5, wherein said step of polymerizing further includes adding and reacting at least one chain extending agent reactive with isocyanates and selected from the group consisting of HZ-D-ZH where D is $C_{2-12}$ alkylene, polyetherpolyols, polytetramethylenediols, polyesterpolyols, polycaprolactonediols, α,ω-OH-terminated polyalkylenes based on polyvinyl acetate, polyvinyl acetate-ethylene copolymers, polyvinyl chloride copolymer, polyisobutylenediols and bishydroxyalkyl silicones.

11. The copolymer of claim 1, which is odorless.

12. The copolymer of claim 1, which is free of cyclic organopolysiloxanes.

13. A process for preparing an organopolysiloxane/polyurea/-polyurethane block copolymer (A) of the formula

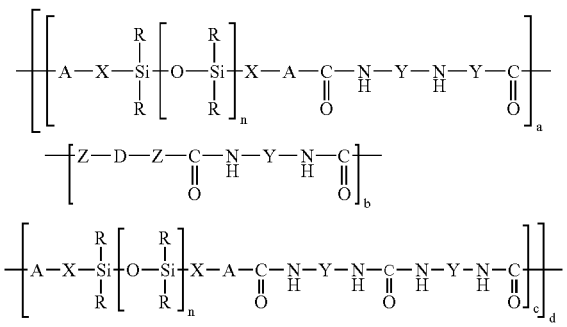

which is prepared by a process comprising
in a first step, reacting a cyclic silazane of the formula

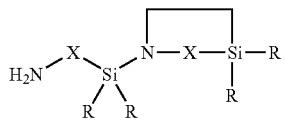

with at least one organosilicon compound of the formula (HO)($R_2$SiO)$_{n-1}$[H]

to give aminoalkylpolydiorganosiloxane(s) of the formula $H_2N$—X—[$SiR_2O$]$_n$$SiR_2$—X—$NH_2$ and
in a further step, polymerizing the aminoalkylpolydiorganosiloxane(s) of the formula (4) with at least one diisocyanate of the formula

OCN—Y—NCO and optionally, with one or more diamine chain extenders, isocyanate-blocked dihydroxy chain extenders, dihydroxy chain extenders, bis(hydroxyalkyl)organopolysiloxanes, or water,
where
R is a monovalent hydrocarbon radical optionally substituted by fluorine or chlorine and having 1 to 20 carbon atoms,
X is an alkylene radical having 1 to 20 carbon atoms, in which nonadjacent methylene units are optionally replaced by —O— groups, A is an oxygen atom or an amino group —NR'—,
Z is an oxygen atom or an amino group —NR'—,
R' is hydrogen or an alkyl radical having 1 to 10 carbon atoms,
Y is a divalent hydrocarbon radical optionally substituted by fluorine or chlorine and having 1 to 20 carbon atoms,
D is an alkylene radical optionally substituted by fluorine, chlorine, $C_1$–$C_6$-alkyl or $C_1$–$C_6$-alkyl ester and having 1 to 700 carbon atoms, in which nonadjacent methylene units are optionally replaced by —O—, —COO—, —OCO—, or —OCOO— groups,
n is from 1 to 4000,
a is is at least 1,
b is from 0 to 40,
c is from 0 to 30, and
d is greater than 0.

14. The process of claim 13, wherein n is an integer from 25 to 250.

15. The process of claim 13, wherein R is methyl.

16. The process of claim 13, wherein X is propylene.

17. The process of claim 13, wherein Z is an amino group.

18. The process of claim 13, wherein Z is an oxygen atom.

19. The process of claim 13, wherein Y is an aralkylene radical.

20. The process of claim 13, wherein Y is a linear or cyclic alkylene radical.

* * * * *

UNITED STATES PATENT AND TRADEMARK OFFICE
CERTIFICATE OF CORRECTION

PATENT NO. : 7,026,424 B2  
APPLICATION NO. : 10/485174  
DATED : April 11, 2006  
INVENTOR(S) : Oliver Schäfer et al.

Page 1 of 2

It is certified that error appears in the above-identified patent and that said Letters Patent is hereby corrected as shown below:

Column 10, Line 25, Claim 1:

Delete:

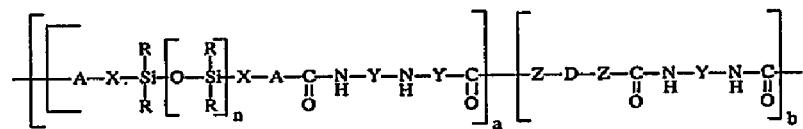

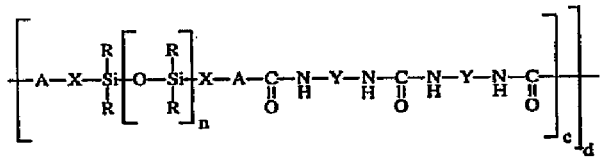

and insert therefor

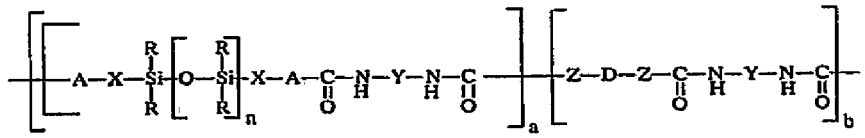

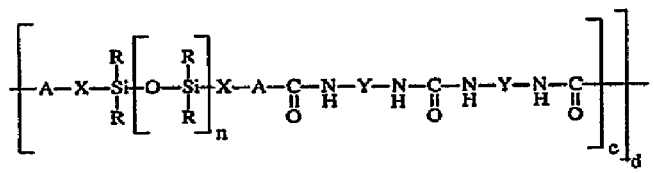

UNITED STATES PATENT AND TRADEMARK OFFICE
CERTIFICATE OF CORRECTION

PATENT NO. : 7,026,424 B2
APPLICATION NO. : 10/485174
DATED : April 11, 2006
INVENTOR(S) : Oliver Schäfer et al.

It is certified that error appears in the above-identified patent and that said Letters Patent is hereby corrected as shown below:

Column 12, Line 20, Claim 13:

Delete:

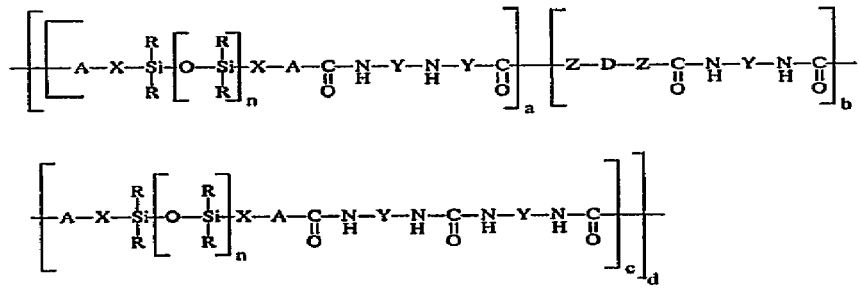

and insert therefor:

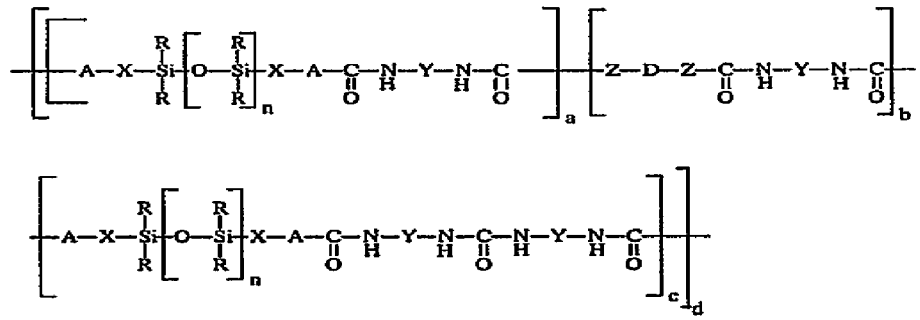

Signed and Sealed this

Second Day of January, 2007

JON W. DUDAS
*Director of the United States Patent and Trademark Office*